US012764524B2

(12) United States Patent
Sebire et al.

(10) Patent No.: US 12,764,524 B2
(45) Date of Patent: Oct. 13, 2026

(54) METHOD AND APPARATUS FOR SECURITY OF A WIRELESS COMMUNICATION

(71) Applicant: Nokia Technologies Oy, Espoo (FI)

(72) Inventors: Benoist Pierre Sebire, Tokyo (JP); Peter Schneider, Holzkirchen (DE)

(73) Assignee: Nokia Technologies Oy, Espoo (FI)

( * ) Notice: Subject to any disclaimer, the term of this patent is extended or adjusted under 35 U.S.C. 154(b) by 396 days.

(21) Appl. No.: 18/446,408

(22) Filed: Aug. 8, 2023

(65) Prior Publication Data

US 2024/0056802 A1 Feb. 15, 2024

Related U.S. Application Data

(60) Provisional application No. 63/370,844, filed on Aug. 9, 2022.

(51) Int. Cl.
*H04L 9/06* (2006.01)
*H04W 12/03* (2021.01)

(52) U.S. Cl.
CPC ........... *H04W 12/03* (2021.01); *H04L 9/0618* (2013.01)

(58) Field of Classification Search
CPC ................................. H04W 12/03; H04L 9/06
See application file for complete search history.

(56) References Cited

U.S. PATENT DOCUMENTS

2002/0164029 A1 11/2002 Jiang
2012/0275399 A1* 11/2012 Liu ..................... H04W 28/065 370/329
2015/0195850 A1 7/2015 Quan et al.
2016/0128093 A1* 5/2016 Lee ....................... H04W 72/23 370/329
2022/0240094 A1* 7/2022 Kim .................... H04W 12/106

FOREIGN PATENT DOCUMENTS

KR 20220015667 A 2/2022

OTHER PUBLICATIONS

Kotuliak et al., "LTRACK: Stealthy Tracking of Mobile Phones in LTE", Proceedings of the 31st USENIX Security Symposium, Aug. 10-12, 2022, 16 pages.
Lakshmanan et al., "A Stealthy Location Identification Attack Exploiting Carrier Aggregation in Cellular Networks", Proceedings of the 30th USENIX Security Symposium, Aug. 11-13, 2021, pp. 3899-3916.
"Revised WID on Further NR mobility enhancements", 3GPP TSG RAN Meeting #96, RP-221799, Agenda: 9.3.2.1, MediaTek Inc, Jun. 6-9, 2022, 5 pages.

(Continued)

*Primary Examiner* — Michael T Vu
(74) *Attorney, Agent, or Firm* — Barta Jones, PLLC

(57) ABSTRACT

Methods and apparatus are disclosed for security of a wireless communication between a communication device and a counterpart communication device. A method performed at the communication device comprises, ciphering a fixed part of a medium access control (MAC) protocol data unit (PDU) at MAC layer for the wireless communication. The fixed part of the MAC PDU comprises at least one of the following fields: at least one MAC control element, or at least one header of radio protocol in the MAC PDU.

13 Claims, 5 Drawing Sheets

(56) References Cited

OTHER PUBLICATIONS

"3rd Generation Partnership Project; Technical Specification Group Radio Access Network; NR; Medium Access Control (MAC) protocol specification (Release 17)", 3GPP TS 38.321, V17.0.0, Mar. 2022, pp. 1-221.
"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.
Extended European Search Report received for corresponding European Patent Application No. 23189671.3, dated Nov. 23, 2023, 10 pages.

* cited by examiner

METHOD AND APPARATUS FOR SECURITY OF A WIRELESS COMMUNICATION

TECHNICAL FIELD

Embodiments of the disclosure generally relate to security of a wireless communication, and more particularly, to methods and apparatus for security in medium access control (MAC) layer in a wireless communication.

BACKGROUND

Communication security has always been an important issue that needs to be paid attention to in a communication. For example, since the second generation (2G) wireless telephone technology, a location of security in the radio protocols has been evolved. Ciphering in 2G global system for mobile communications (GSM) for circuit switched (CS) services was done after channel coding and interleaving but before modulation at the physical layer. With an introduction of general packet radio service (GPRS) and packet services, not everything could be ciphered. Because header fields had to be decoded by several UEs, ciphering is moved up to medium access control (MAC) layer. Then, in universal mobile telecommunications system (UMTS) terrestrial radio access network (UTRAN) of third Generation (3G) wireless telephone technology, ciphering is moved up to radio link control (RLC) layer.

In long term evolution (LTE) of fourth generation (4G) wireless telephone technology, ciphering was first considered in the core network (CN), but then is moved back to a packet data convergence protocol (PDCP) layer in radio access network (RAN) where it remains today. The main benefits of having security located in the PDCP layer were that, it allows reusing PDCP sequence number (SN) in RLC layer, secures any layer above the PDCP layer (and allows the PDCP layer to be hosted remotely from a radio site in the radio access network), and minimizes memory consumption since the PDCP layer and all layers under it can point towards the same buffer of encrypted data. Another major benefit is that, by pulling security to a higher layer in radio protocols, the processing requirements of security become less stringent: it essentially becomes a non-real-time operation.

In new radio (NR) of fifth generation (5G) wireless telephone technology, a same approach as LTE was adopted with security remaining in the PDCP layer.

However, there are still some challenges in having security located at the PDCP layer.

SUMMARY

This summary is provided to introduce simplified concepts of the present disclosure. This summary is not intended to identify key features or essential features of the claimed subject matter, nor is it intended to be used to limit the scope of the claimed subject matter.

According to a first aspect of the disclosure, there is provided a first apparatus at a communication device for security of a wireless communication performed by the communication device. The first apparatus comprises at least one processor, and at least one memory storing instructions, that when executed on the one or more processors, cause the first apparatus to cipher a fixed part of a medium access control (MAC) protocol data unit (PDU) at MAC layer for a wireless communication. The fixed part of the MAC PDU comprises at least one of the following fields: at least one MAC control element, or at least one header of radio protocol.

According to a second aspect of the disclosure, there is provided a second apparatus at a communication device for security of a wireless communication between the communication device and a counterpart communication device. The second apparatus comprises at least one processor, and at least one memory storing instructions, that when executed on the one or more processors, cause the second apparatus to obtain a ciphered medium access control (MAC) protocol data unit (PDU), from the counterpart communication device of a wireless communication; and decipher a fixed part of the ciphered MAC PDU at MAC layer. The fixed part of the ciphered MAC PDU comprises at least one of the following fields: at least one MAC control element, or at least one header of radio protocol in the MAC PDU.

According to a third aspect of the disclosure, there is provided a method performed by a communication device for security of a wireless communication between the communication device and a counterpart communication device. The method comprises: ciphering a fixed part of a medium access control (MAC) protocol data unit (PDU) at MAC layer for a wireless communication. The fixed part of the MAC PDU comprises at least one of the following fields: at least one MAC control element, or at least one header of radio protocol.

According to fourth aspect of the disclosure, there is provided a method performed by a communication device for security of a wireless communication between the communication device and a counterpart communication device. The method comprises: obtaining a ciphered medium access control (MAC) protocol data unit (PDU), from the counterpart communication device; and deciphering a fixed part of the ciphered MAC PDU at MAC layer. The fixed part of the ciphered MAC PDU comprises at least one of the following fields: at least one MAC control element, or at least one header of radio protocol in the MAC PDU.

According to fifth aspect of the present disclosure, it is provided a computer readable storage medium, on which instructions are stored, when executed by at least one processor, the instructions cause the at least one processor to perform any method according to the third aspect and the fourth aspect.

According to sixth aspect of the present disclosure, it is provided computer program product comprising instructions which when executed by at least one processor, cause the at least one processor to perform any method according to the third aspect and the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings in which.

DETAILED DESCRIPTION

Figure 1:
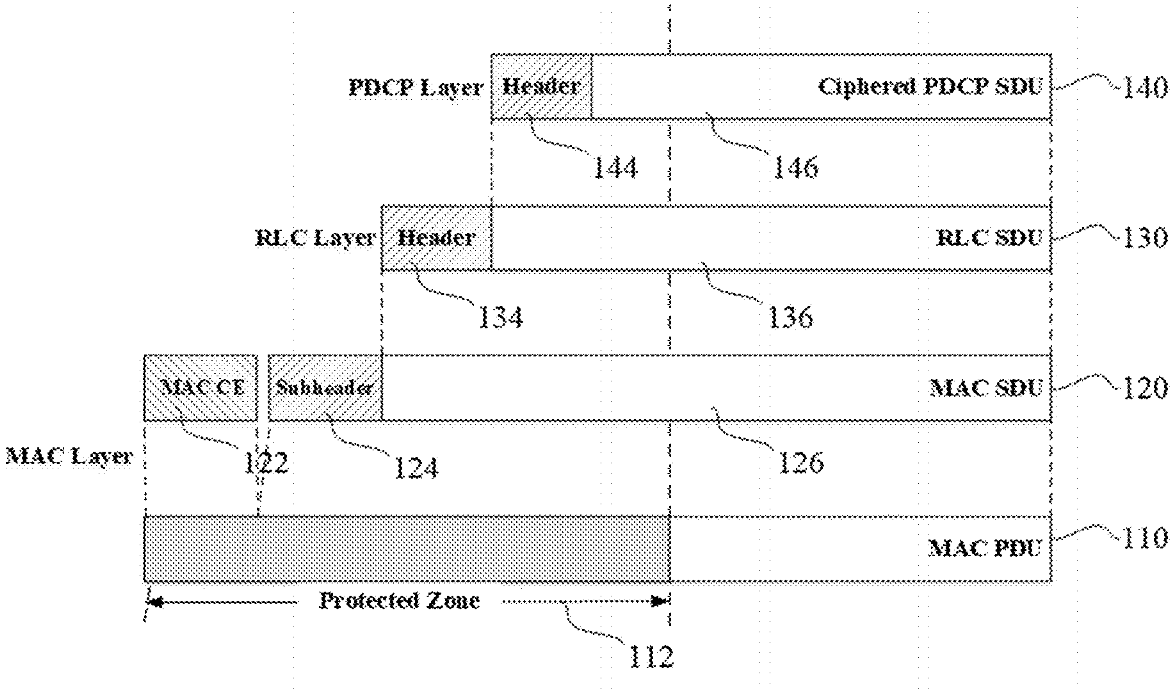
FIG. 1 illustrates an example MAC PDU according to embodiments of the present disclosure.

Some example embodiments will now be described more fully hereinafter with reference to the accompanying drawings, in which some, but not all embodiments are shown. Indeed, the example embodiments may take many different forms and should not be construed as fixed to the embodiments set forth herein; rather, these embodiments are provided so that this disclosure will satisfy applicable legal requirements. Like reference numerals refer to like elements throughout.

In the following description and claims, unless defined otherwise, all technical and scientific terms used herein have the same meaning as commonly understood by one of ordinary skills in the art to which this disclosure belongs.

References in the present disclosure to "one embodiment", "an embodiment", "an example embodiment", and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, the term "and/or" includes any and all combinations of one or more of the listed terms.

As used in this application, the term "circuitry" may refer to one or more or all of the following:

(a) hardware-only circuit implementations (such as implementations in only analog and/or digital circuitry) and and (b) combinations of hardware circuits and software, such as (as applicable):

(i) a combination of analog and/or digital hardware circuit(s) with software/firmware (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all uses of this term in this application, including in any claims. As a further example, as used in this application, the term "circuitry" also covers an implementation of merely a hardware circuit or processor (or multiple processors) or portion of a hardware circuit or processor and its (or their) accompanying software and/or firmware. The term "circuitry" also covers, for example and if applicable to the particular claim element, a baseband integrated circuit or processor integrated circuit for a mobile device or a similar integrated circuit in server, a cellular network device, or other computing or network device.

As used herein, the term "communication system" refers to a system following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, a wireless communication between a terminal device and a network device in one or more wireless communication systems may be performed according to any suitable generation communication protocols, including, but not limited to, the 4G, the 5G, the future sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "wireless communication device" refers to any device that can execute wireless communication, which may be a terminal device or a network device. A terminal device refers to a wireless communication device which is enable to access a communication network and receive services therefrom via a wireless link By way of example and not limitation, the terminal device may refer to a user equipment (UE), or other suitable devices. The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, an Internet of things (IoT) device, a machine-to-machine (M2M) device, and the like. The network node may be a device providing a radio network access service to a terminal device. The network node may include, but not limited to, a base station, a NodeB, a gNB or an access point (AP).

Although there are benefits in having security located at the PDCP layer as mentioned above, such a location is not without any drawbacks. For example, all headers of the layers below the PDCP layer, and control PDUs of the layers below the PDCP layer (e.g., MAC control elements (CEs))

as well as PDCP SN are left in clear (e.g., transmitted in plain-text) over the air interface.

The lack of protection of the lower layers may be exploited by the attacker. As more functions will be implemented on MAC layer, the risk posed by unprotected MAC layer will get higher in the future. For instance, a new work item of 3GPP on further NR mobility enhancements suggests "to specify mechanism and procedures of L1/L2 based inter-cell mobility for mobility latency reduction". This means that MAC control element (CE) for controlling UE mobility can be introduced. Thus, it can be expected that more (and more impactful) attacks targeting this unprotected MAC layer may emerge.

Ciphering incoming service data units (SDUs) to deliver ciphered PDUs is a well-known technique. Introducing ciphering in the MAC layer (L2) or in the physical layer (L1) may be considered as obvious. However, there are some drawbacks in such straightforward solutions. For example, if a sequence number (SN) such as a MAC SN is required, overhead will increase. Ciphering becomes a real time operation, which is especially problematic to handle large data rates at a user equipment (UE).

The present disclosure proposes an advanced security mechanism for wireless communication. In a nutshell, it proposes ciphering a fixed part of MAC PDUs at MAC layer. Ciphering in PDCP layer may be kept as usual. The fixed part is taken into account when building MAC PDUs. In this regard, a MAC PDU may be built so that at least one MAC control element, or at least one header of radio protocol, or at least one MAC control element and at least one MAC header of radio protocol is included in the fixed part. The at least one header may comprise at least one of MAC subheader(s), RLC header(s), or PDCP header(s).

The fixed part of a MAC PDU to be protected is a block of consecutive bits in a MAC PDU (also called Protected Zone). The Protected Zone is of a fixed size. The size is not flexible in the sense that it can change per transport block, i.e., from one MAC PDU to another MAC PDU. The size can be negotiated, or simply signaled by the communication network/system. Alternatively, it can be even specified as a fixed value in a communication standard or protocol. The Protected Zone is at a fixed location within every MAC PDU. The fixed location can be at the begin of each MAC PDU or transport block (TB), or somewhere else in the TB, e.g., at the end of each TB for uplink traffic.

FIG. 1 illustrates an example MAC PDU built according to embodiments of the present disclosure. As shown in FIG. 1, a PDCP header 144 is assigned to a ciphered PDCP SDU 146, thus forming a PDCP PDU 140. The PDCP SDU 146 may be ciphered in a traditional way at the PDCP layer. The PDCP PDU 140 is delivered to RLC layer, and then processed as a RLC SDU 136 at the RLC layer. A RLC header 134 is assigned to the RLC SDU 136, thus forming a RLC PDU 130. The RLC SDU 130 is delivered to MAC layer, and then processed as a MAC SDU 126 at the MAC layer. A MAC subheader 124 is assigned to the MAC SDU 126, thus forming a MAC subPDU 120. At MAC layer, a MAC CE may be triggered, forming a MAC subPDU (with its corresponding MAC subheader, not shown in FIG. 1), denoted as 122. These MAC subPDUs are encapsulated into one MAC PDU, denoted as 110. A MAC PDU is to be delivered to the physical layer as a transport block.

Although there is only one MAC CE and one MAC SDU encapsulated in one MAC PDU in FIG. 1, it can be appreciated that one MAC PDU may consist of at least one of the following:

- A MAC subheader only;
- One or more MAC SDUs with respective MAC subheaders; or
- One or more MAC CEs (with respective MAC subheaders).

According to embodiments of the present disclosure, before the delivery to the physical layer, a fixed part (also called as Protected Zone) of a MAC PDU is ciphered at the MAC layer. In some embodiments, the Protected Zone to be ciphered may be located at the beginning of every MAC PDU (i.e., transport block). MAC CEs and possibly MAC subheaders may be placed together. MAC subPDU(s) with MAC CE(s) may be placed before any MAC subPDU with MAC SDU and MAC subPDU with padding, as depicted in FIG. 1, so as to fit in the Protected Zone. The MAC PDU may be a downlink MAC PDU. In the example of FIG. 1, the following fields: a first MAC CE 122, and MAC subheader 124 of the first MAC SDU 126, and part of payload of the first MAC SDU 126 which contains RLC header 134 and PDCP header 144 encapsulated in MAC SDU 126, can be included in a Protected Zone 112. Then, a Protected Zone 112 of the MAC PDU can be ciphered so that a MAC CE and headers (including MAC subheader 124, RLC header 134 and PDCP header 144) of a first MAC SDU (service data unit) are all ciphered.

As numbers and sizes of MAC CEs, MAC SDUs and their associated MAC subheader to be transmitted are dynamic, the MAC subPDUs and corresponding subheaders that fit in the Protected Zone may vary with their numbers and sizes. In an example, the Protected Zone can cover a part of MAC CEs, and/or cover a part of subheaders of MAC SDUs. In an example, the Protected Zone 112 may only cover MAC CE 122, or only cover MAC subheader 124, or only cover MAC CE 122 and MAC subheader 124, or cover MAC subheader 124, RLC header 134 and PDCP header 144. In some examples, paddings need to be included in the Protected Zone.

Figure 2:
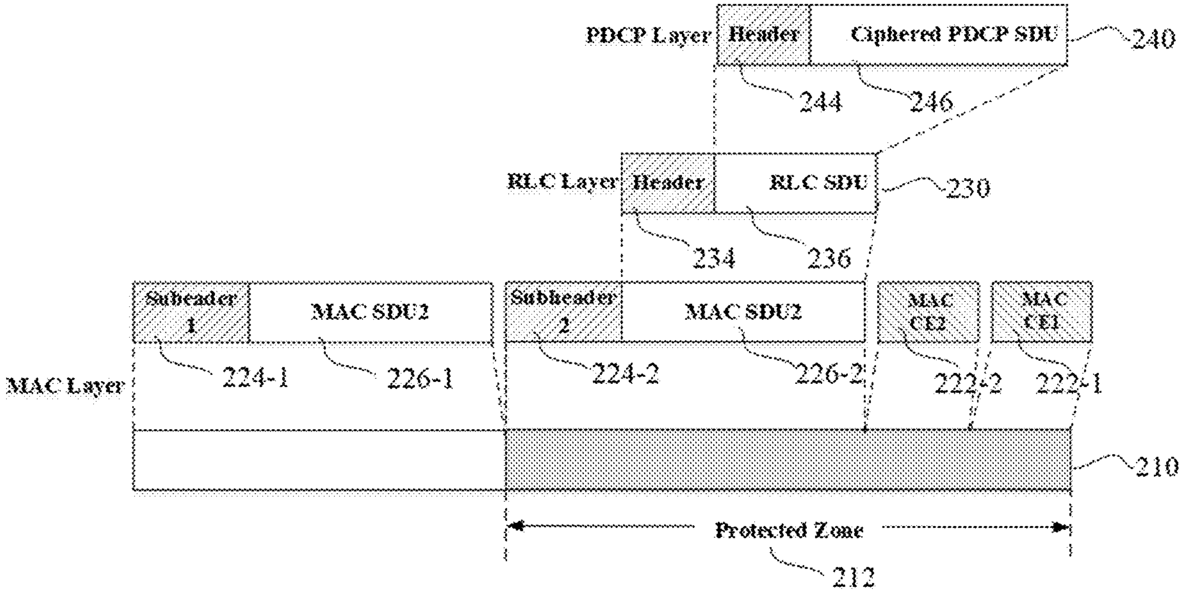
FIG. 2 illustrates another example MAC PDU according to embodiments of the present disclosure.

In some embodiments, a Protected Zone may be located at the end of every MAC PDU. In this regard, MAC subPDU(s) with MAC CE(s) may be placed after any MAC subPDU with MAC SDU and MAC subPDU with padding, as depicted in FIG. 2. For example, the MAC PDU may be an uplink MAC PDU. As shown in FIG. 2, MAC PDU 210 is consisted of two MAC SDUs with respective MAC subheaders, and two MAC CEs. The following fields: a first MAC CE (denoted as MAC CE1, 222-1), a second MAC CE (denoted as MAC CE2, 222-2) and headers (including MAC subheader 224-2, RLC header 234 and PDCP header 244) of the last MAC SDU (denoted as MAC SDU2, 226-2) of the MAC PDU 210, can fit in the Protected Zone 212. The Protected Zone 212 further covers the last MAC SDU. Then, a Protected Zone of the MAC PDU may be ciphered so that at least one MAC CE and headers (including MAC subheader, RLC header and PDCP header) of the last MAC SDU are all ciphered. In some embodiments, the MAC subheader 224-2 of the last MAC SDU may be placed after MAC SDU2. As such, in case that the size of the Protected Zone is not big enough to accommodate the entire MAC SDU2, the MAC subheader of MAC SDU2 still can be protected.

In some embodiments, the Protected Zone is located other location (except for the beginning or the end) within every MAC PDU. In this case, an indication may be needed to indicate where the Protected Zone starts, so that a receiver can locate the Protected Zone correctly. The indication could be a part of configuration of the communication, or be dynamically signaled with every transport block. However, it is a favorable to have the Protected Zone at the beginning of every MAC PDU. Otherwise, more signaling overhead would be needed to indicate where the Protected Zone starts.

In some embodiments, a fixed size of a Protected Zone may be a size that matches (or equals to) a block size of a block cipher that is applied to encrypt the Protected Zone. So, the encryption can be done with a single pass of the block cipher. Alternatively, a fixed size of a Protected Zone may be a fixed multiple of the block size of the block cipher.

The numbers and sizes of MAC CEs, MAC SDUs and their associated MAC subheader to be transmitted are fully dynamic, while the size of Protected Zone is fixed. Hence, rules for building a MAC PDU may be needed, especially for the cases in which some MAC CEs and/or MAC subheaders cannot fit in the Protected Zone. In this regard, the information or bits that need protection most urgently can be prioritized into the Protected Zone. If there is still room, the Protected Zone can be filled up with other MAC CEs, subheaders or SDUs. In some embodiments, the size and/or location of the Protected Zone can be taken into account when deciding how to build a MAC PDU (or transport block). For example, a MAC PDU may be built according to some of the following principles.

(1) In case that too many MAC CEs need to be sent, one or more MAC CEs may be placed outside the Protected Zone.

Figure 3:
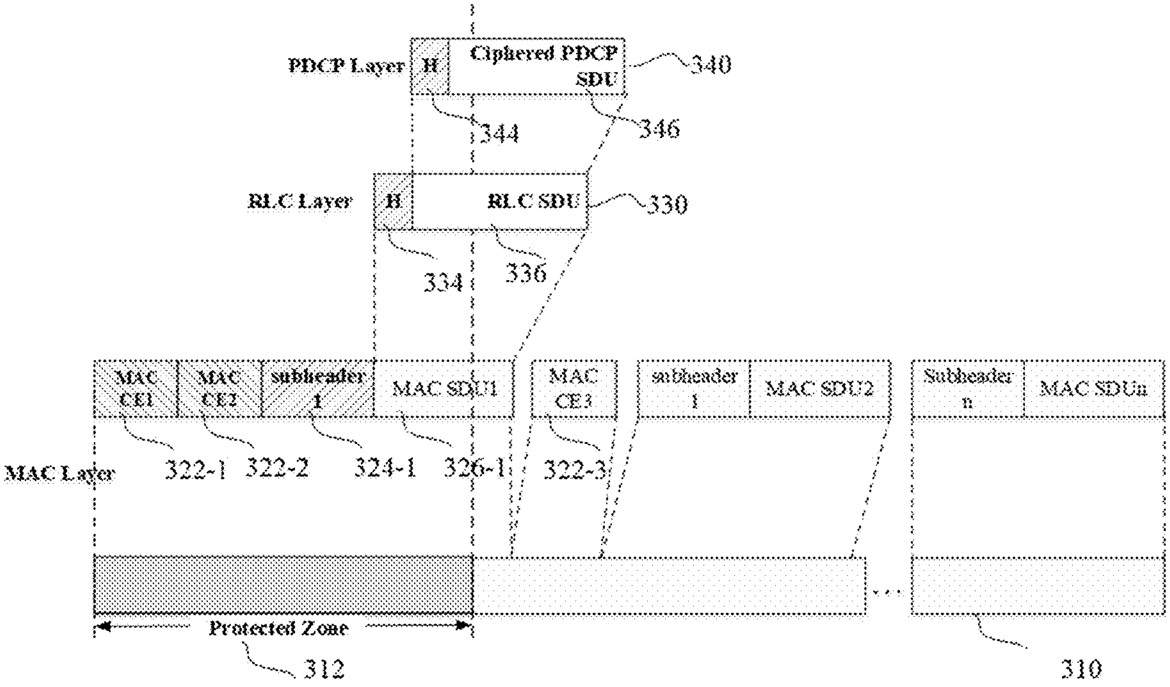
FIG. 3 illustrates another example MAC PDU according to embodiments of the present disclosure.

For example, if it is determined that the size of the Protected Zone is not big enough to accommodate all of the MAC CEs, as well as all subheaders of MAC SDUs and/or beginning of a first MAC SDU (in order to protect potential RLC and PDCP headers), one or more MAC CEs may be pushed outside the Protected Zone. FIG. 3 illustrates an example MAC PDU built in such way. MAC PDU 310 comprises three MAC CEs, namely MAC CE1 (denoted as 322-1), MAC CE2 (denoted as 322-2), and MAC CE3 (denoted as 322-3). MAC PDU 310 further comprises one or more MAC SDUs (e.g., n MAC SDUs), namely MAC SDU1 (denoted as 326-1) plus its corresponding subheader (denoted as 324-1), MAC SDU2 plus its corresponding subheader, . . . , and MAC SDUn plus its corresponding subheader. As shown in FIG. 3, MAC CE3 is placed outside the Protected Zone 312. MAC CE1 and MAC CE2 may be included in the Protected Zone 312. Headers of the first MAC SDU 324-1 (MAC SDU1) may also be covered by the Protected Zone 312.

(2) In case that too many MAC CEs need to be sent, one or more MAC CEs may be postponed to a next MAC PDU.

For example, if it is determined that the size of the Protected Zone is not big enough to accommodate all of the triggered MAC CEs, as well as all subheaders of the MAC SDUs and/or beginning of a first MAC SDU (in order to protect potential RLC and PDCP headers), one or more MAC CEs may be postponed to a next MAC PDU.

The MAC CEs to be placed outside the Protected Zone or the MAC CEs to be postponed can be selected or determined based on predefined prioritization rules. For example, the predefined prioritization rules are agreed among the two parties of the wireless communication (i.e., a transmitting party and a receiving party). Alternatively, the predefined rules do not need to be negotiated. For example, it is specified that the MAC CEs of a lowest priority would be postponed to a next MAC PDU. The postponed MAC CE may be included in a Protected Zone of in the next MAC PDU.

(3) In case that a plurality of MAC CEs are triggered and can be included in the Protected Zone, the order in which they are included in the MAC PDU can be randomized to decrease the probability that protected zones with the same content encrypted with the same key appear in different transport blocks, which could be recognized by an observer, and if happening regularly, could reveal communication patterns to the observer.

(4) If a plurality of MAC SDUs need to be included in a MAC PDU (i.e., transport block), the MAC subheaders of these MAC SDUs can be concatenated.

Figure 4:
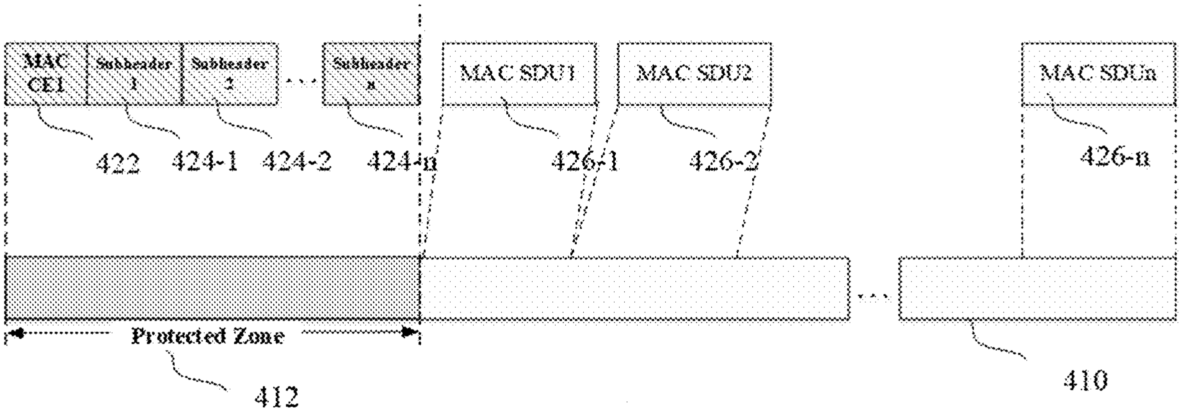
FIG. 4 illustrates another example MAC PDU according to embodiments of the present disclosure.

In case that the Protected Zone is located at the beginning of the MAC PDU, the concatenated MAC subheaders is placed at the beginning of the MAC PDU (e.g., as in LTE). FIG. 4 illustrates an example MAC PDU built in such way. MAC PDU 410 comprises one MAC CE, namely MAC CE1 (denoted as 422) and a plurality of MAC SDUs (e.g., n MAC SDUs), namely MAC SDU1 (denoted as 426-1) plus its corresponding subheader (denoted as 424-1), MAC SDU2 (denoted as 426-2) plus its corresponding subheader (denoted as 424-2), . . . , and MAC SDUn (denoted as **426-*n*) plus its corresponding subheader (denoted as 424-*n*). As shown in FIG. 4, the MAC subheaders 424-1, 424-2, . . . , 424-*n* are concatenated at the beginning of MAC PDU 410, so that the MAC CE and the concatenated subheaders 424-1, 424-2, . . . , 424-*n* can be covered by the Protected Zone 412**. It should be noted that in practice, the Protected Zone always cannot match exactly the number of subheaders. In this scenario, padding bits may be included in the Protected Zone.

In case that the Protected Zone is located at the end of the MAC PDU, the MAC subheaders can be concatenated at the end of the PDU.

(5) If a plurality of MAC SDUs need to be included in a MAC PDU (i.e., transport block), the order in which the MAC SDUs appear in the MAC PDU can change from one MAC PDU to another.

(6) If padding bits need to be included in the Protected Zone, the padding bits may be randomized (0, 1) to decrease the probability that protected zones with the same content encrypted with the same key appear in different transport blocks, which could be recognized by an observer, and if happening regularly, could reveal communication patterns to the observer.

(7) If not all MAC CEs need to be protected, the ones not requiring transmission in the Protected Zone can be sent at the opposite side of the MAC PDU always.

Figure 5:
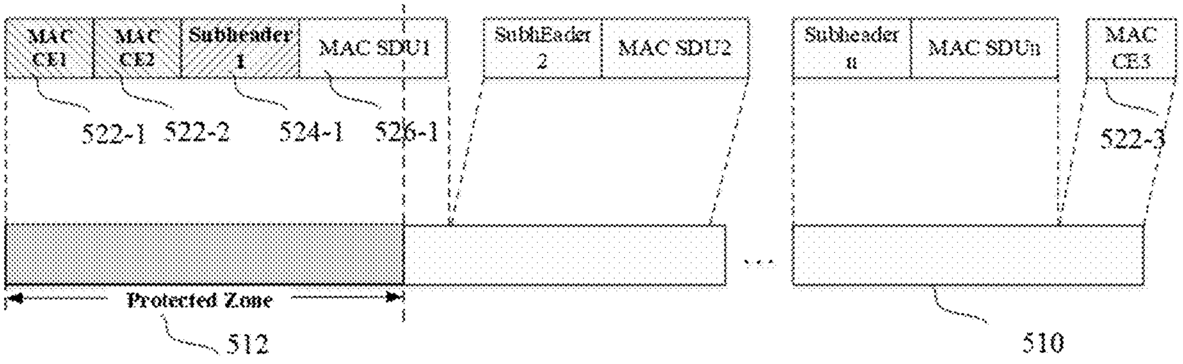
FIG. 5 illustrates another example MAC PDU according to embodiments of the present disclosure.

For example, in case that the Protected Zone is located at the beginning of the MAC PDU, the MAC CEs not requiring transmission in the Protected Zone can be placed at the end of the MAC PDU always. FIG. 5 illustrates an example MAC PDU built in such way. As shown in FIG. 5, MAC CE3 (denoted as 522-3) which is not to be protected is placed at the end of MAC PDU 510. MAC CE1 (denoted as 522-1) and MAC CE2 (denoted as 522-2) are placed at the beginning of MAC PDU 510 so as to be included in the Protected Zone. In another example, in case that the Protected Zone is placed at the end of the MAC PDU, the MAC CEs not requiring transmission in the Protected Zone can be placed at the beginning of the MAC PDU always.

Figure 6:
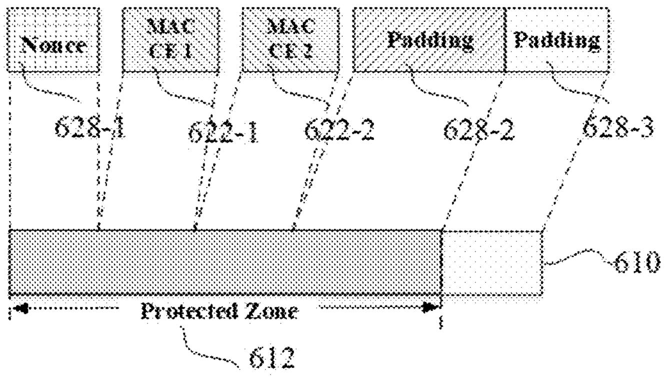
FIG. 6 illustrates another example MAC PDU according to embodiments of the present disclosure.

In some embodiments, a random nonce may be added at the beginning of the Protected Zone. These can avoid any repeating patterns that might be detected in the encrypted communication. FIG. 6 illustrates an example MAC PDU 610 built in this way, in which MAC PDU 610 starts with a nonce field 628-1. The nonce field 628-1 may be considered as a padding field of a fixed size with random padding bits. The random nonce is a part of the Protected Zone. If the Protected Zone is at the beginning of a MAC PDU, and the nonce field is of a fixed size and always at the beginning of the of a MAC PDU, there is no need to indicate what part of the message is the nonce. Thus, the nonce can be discarded by the receiver after decryption without further action on it. Otherwise, if the Protected Zone can be anywhere, an indication would be needed to indicate where it starts, so that a receiver can find the Protected Zone correctly. The nonce field of a fixed size could then also be always at the beginning of the Protected Zone.

Another embodiment is that a new type of MAC CE can be defined. The new type of MAC CE does not trigger any action, and has random content. It may be of a variable size. Such a MAC CE could be placed anywhere in the Protected Zone. Its purpose would be to randomize the encrypted block of the Protected Zone.

In some embodiments, the size of the Protected Zone may be configured. It may be a capability for both the transmitting party (e.g., transmitter) or the receiving party (e.g., receiver). For example, the transmitter and receiver may be able to support a Protected Zone of 256 or 512 bits. The capability can be exchanged between the transmitting party and the receiving party. In an example, the two communication parties may be a UE and a radio access network node (e.g., NodeB, gNB, etc.). Capability parameters indicating one or more candidate sizes supported by the UE and the NodeB may be exchanged via a radio resource control (RRC) signaling (such as SRB1), e.g., when the UE is transferring to RRC CONNECTED state. Then, the size of the Protected Zone can be determined based on the supported candidate sizes, and taken into account some of the principles outlined above.

Figure 7:
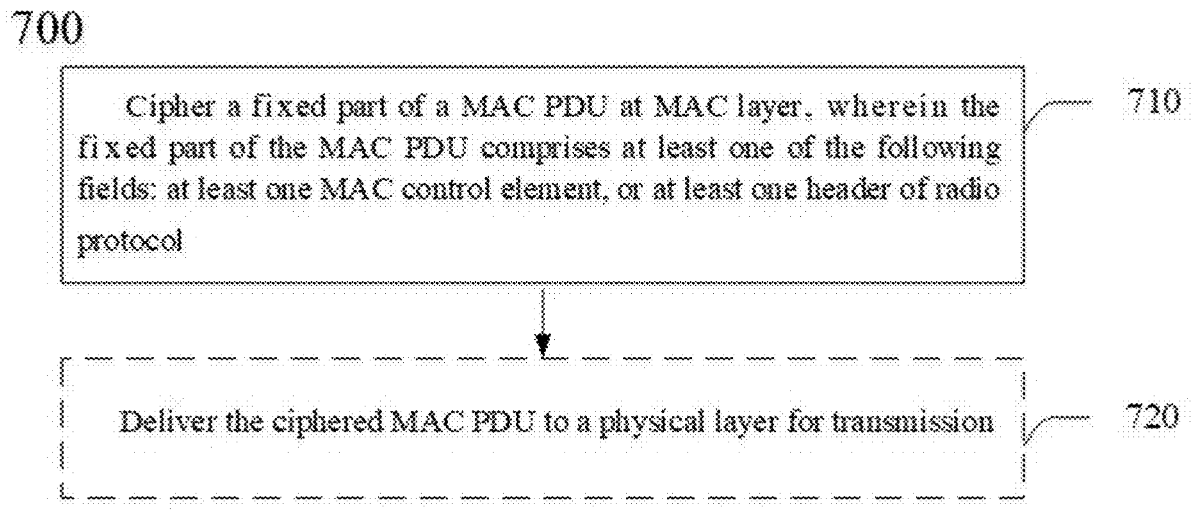
FIG. 7 is a flow chart depicting a method according to an embodiment of the present disclosure.

FIG. 7 is a flow chart depicting a method 700 according to embodiments of the present disclosure. The method 700 can be implemented at a ciphering side, which may be any suitable communication device. For example, the method 700 may be implemented at a wireless communication device, which is configured to perform wireless communication with a counterpart communication device. For the convenience of description, the wireless communication between a UE and a radio access network node (such as a gNB) is taken as an example below. It can be appreciated that the method 700 may be implemented at other terminal devices or network devices.

As shown at block 710, a method 700 comprises ciphering a fixed part of a MAC PDU at MAC layer, e.g., in a UE. The fixed part of the MAC PDU comprises at least one of the following fields: at least one MAC control element, or at least one header of radio protocol. Ciphering at a PDCP layer may be kept as normal.

A well-scrutinized crypto algorithm (e.g., block cipher) such as AES can be used for ciphering the fixed part of MAC PDU. For more flexibility, more than one crypto algorithm can be supported and negotiated between the UE and the gNB. This negotiation may be combined with a negotiation procedure of the crypto algorithms for the PDCP.

A shared key for the block cipher for the fixed part can be derived from the key (e.g., denoted as $K_{gNB}$) at the UE side and at the wireless network side, using mechanisms traditionally applied to derive keys used by the PDCP layer. With a new $K_{gNB}$, the key for the block cipher can be changed.

In the case of transmission of short transport blocks, e.g., containing only a single MAC CE and otherwise filled up with uniform padding to allow the execution of the block cipher, it can happen that, identical messages (contained in MAC CEs) may be transmitted at different times. If the key has not changed between the transmission, the encrypted TBs will be identical. The attackers might observe when a transport block is transmitted that is identical to a previously transmitted one and profit somehow from this knowledge. For this reason, the padding can be randomized. For example, the padding can be in the form of a MAC CE that indicates "no operation", and has otherwise random content of potentially variable size.

Alternatively, in order to make any repeating patterns that might be detected in the encrypted communication highly unlikely, each transport block (i.e., MAC PDU) can also be started with a random nonce of a specified size, as shown in FIG. 6.

In some embodiments, the method 700 may further comprise delivering the ciphered MAC PDU to a physical layer for transmission. For example, A UE may transmit a ciphered uplink MAC PDU to a gNB. It can be appreciated that the method 700 may be executed in a gNB. In this case, a gNB may cipher a downlink MAC PDU as indicated at block 710, and transmit a ciphered downlink MAC PDU to a UE.

In some embodiments, the method 700 may further comprise obtaining by the wireless communication device (e.g., UE), an indication of the size of the fixed part of the MAC PDU. In an example, the wireless communication device may check its own configuration of a capability for such ciphering, and determine the size of the fixed part. In another example, the indication may be received from the counterpart communication device, or other network devices, such as a base station serving the communication device. For example, a UE may receive such indication from a gNB or other network devices.

In some embodiments, the method 700 may further comprise obtaining by the communication device (e.g., UE), an indication of one or more candidate sizes of the fixed part, and then select or determine one candidate size as the size of the fixed part. The indication may comprise at least one of the following: a capability parameter of the UE, which indicates one or more candidate sizes of the fixed part supported by the UE; or a capability parameter of the gNB, which indicates one or more candidate sizes of the fixed part supported by the gNB. In some examples, the wireless communication device may check a configuration of its own candidate sizes for this ciphering. Alternatively or additionally, the wireless communication device may receive the candidate sizes of the fixed part from the counterpart communication device, or other network devices, such as a base station serving the communication device.

In some embodiments, the method 700 may further comprise sending to the gNB, an indication of the size of the fixed part. In some embodiments, the method 700 may further sending to the gNB an indication of one or more candidate sizes of the fixed part, so as to negotiate a suitable size of the fixed part with the gNB. The indication of the one or more candidate sizes may comprise a capability parameter of the UE, which indicates one or more candidate sizes of the fixed part supported by the UE.

In some embodiments, the supported sizes of the fixed part (e.g., indicated by a capability parameter) can be exchanged between a UE and a gNB. In this regard, a UE may transmit to a gNB a capability parameter of the UE, which indicates one or more candidate sizes of the fixed part supported by the UE, and receive from the gNB a capability parameter of the gNB, which indicates one or more candidate sizes of the fixed part supported by the gNB. The exchanging of the capability parameters may be performed before data transmission between the UE and gNB, e.g., be performed when the UE is transferred to RRC CONNECTED state. These capability parameters may be transmitted via a radio resource control signaling, such as SRB1.

Then, the size of the fixed part may be determined at least based on the capability parameter of the UE and the capability parameter of the gNB.

Figure 8:
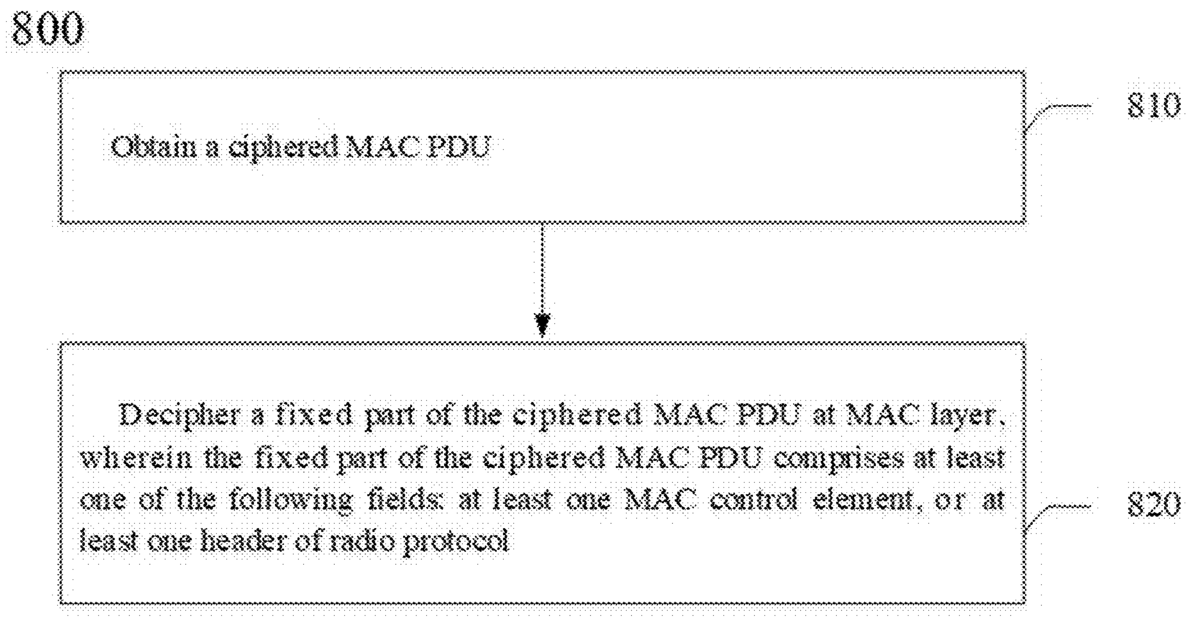
FIG. 8 is a flow chart depicting a method according to an embodiment of the present disclosure.

FIG. 8 is a flow chart depicting a method 800 according to embodiments of the present disclosure. The method 800 can be implemented at a deciphering side, which may be any suitable communication device. For example, the method 800 may be implemented at a wireless communication device, such as a UE and a radio access network node (such as a gNB). It can be appreciated that the method 800 may be implemented at other wireless terminal devices or wireless network devices. Features introduced above with respect to the ciphering side are also applicable to the deciphering side. For the sake of brief descriptions, repeated features will not be described in detail for FIG. 8.

As shown at block 810, a method 800 comprises obtaining a ciphered MAC PDU. The ciphered MAC PDU may be delivered to MAC layer from a physical layer, for example at a UE by receiving a downlink communication from a gNB, or at a gNB by receiving an uplink communication from a UE.

Then, as shown at block 820, a method 800 comprises deciphering a fixed part of the MAC PDU at MAC layer. The fixed part of the ciphered MAC PDU comprises at least one of the following fields: at least one MAC control element, or at least one header of radio protocol in the MAC PDU.

In some embodiments, the method 800 may further comprises obtaining an indicate of the size of the fixed part or one or more candidate sizes of the fixed part. For example, the indication can be received from the counterpart communication device (e.g., UE), or from other network devices (e.g., gNB, or a core network device). Then, a suitable size of the fixed part may be selected from the one or more candidate sizes of the fixed part, according to various communication requirements.

In some embodiments, the method 800 may further comprises sending to the UE, an indication of the size of the fixed part. In some embodiments, the method 800 may further sending to the UE an indication of one or more candidate sizes of the fixed part, so as to negotiate a suitable size of the fixed part with the UE. The indication of the one or more candidate sizes may comprise a capability parameter of the gNB, which indicates one or more candidate sizes of the fixed part supported by the gNB.

With the mechanisms outlined above, keeping ciphering at PDCP layer while relying on the protection of a fixed part of MAC PDUs allows the MAC CEs and the headers of the radio protocols to be protected, but without increasing the real-time processing requirements to unsustainable levels.

The various aspects of the present disclosure are not, however, restricted to the 5G NR communication system that is given as an example, but a person skilled in the art may apply the solution to other communication systems.

Figure 9:
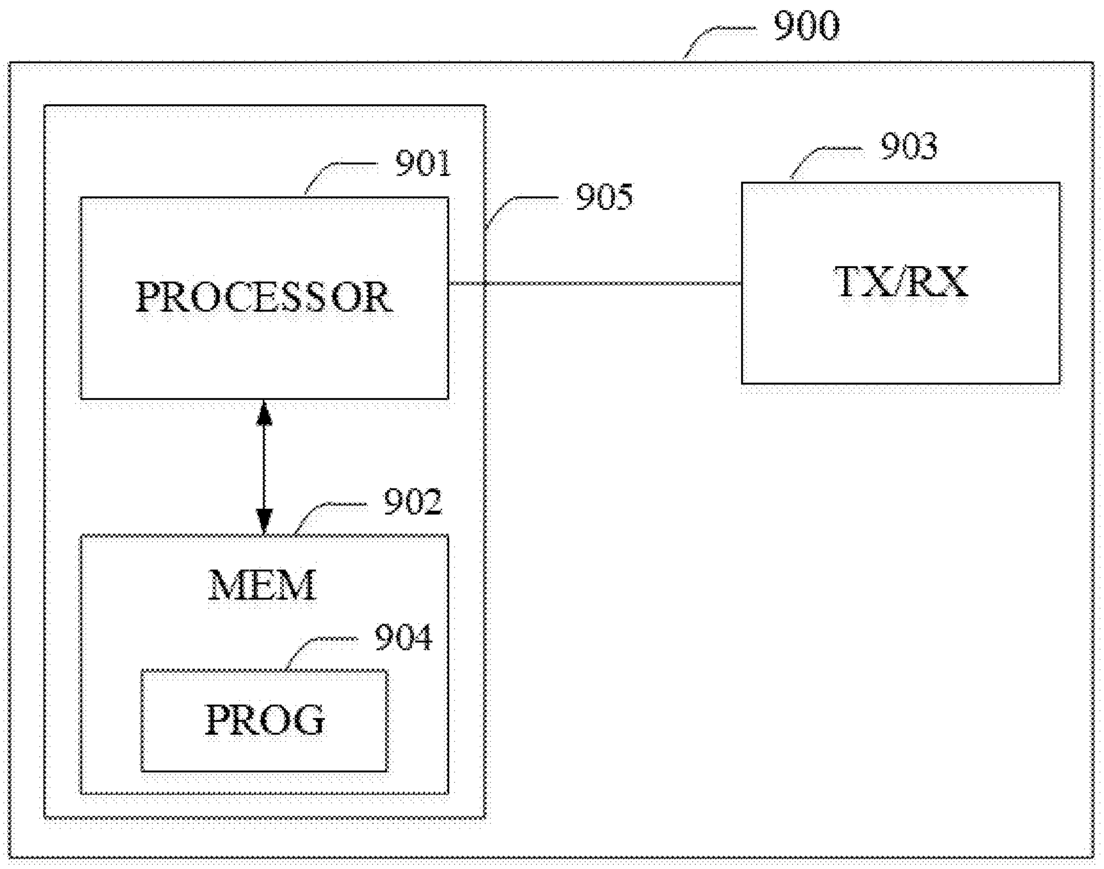
FIG. 9 shows a simplified block diagram of an apparatus according to an embodiment of the present disclosure.

Now reference is made to FIG. 9 illustrating a simplified block diagram of an apparatus 900 that may be embodied in/as a wireless communication device (such as a UE, a gNB). The apparatus 900 may comprise at least one processor 901, such as a data processor (DP) and at least one memory (MEM) 902 coupled to the at least one processor 901. The apparatus 900 may further comprise one or more transmitters TX, one or more receivers RX 903, or one or more transceivers coupled to the one or more processors 901 to communicate wirelessly and/or through wireline.

Although not shown, the apparatus 900 may have at least one communication interface, for example, the communicate interface can be at least one antenna, or transceiver as shown in the FIG. 9. The communication interface may represent any interface that is necessary for communication with other network entities.

The processors 901 may be of any type suitable to the local technical environment, and may include one or more of the following: general purpose computers, special purpose computers, microprocessors, digital signal processors (DSPs) and processors based on multicore processor architecture, as non-limiting examples.

The MEMs 902 may be of any type suitable to the local technical environment and may be implemented using any suitable data storage technology, such as semiconductor-based memory devices, magnetic memory devices and systems, optical memory devices and systems, fixed memory and removable memory, as non-limiting examples.

The MEM 902 stores a program (PROG) 904. The PROG 904 may include instructions that, when executed on the associated processor 901, enable the apparatus 900 to operate in accordance with the embodiments of the present disclosure, for example to perform one of the methods 700 and 800. A combination of the at least one processor 901 and the at least one MEM 902 may form processing circuitry or means 905 adapted to implement various embodiments of the present disclosure.

Various embodiments of the present disclosure may be implemented by computer program executable by one or more of the processors 901, software, firmware, hardware or in a combination thereof.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosures may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosures may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium, for example, non-transitory computer readable medium, such as a hard disk, optical disk, removable storage media, solid state memory, RAM, etc. As will be appreciated by one of skills in the art, the function of the program modules may be combined or distributed as desired in various embodiments. In addition, the function may be embodied in whole or in part in firmware or hardware equivalents such as integrated circuits, field programmable gate arrays (FPGA), and the like.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. An apparatus at a communication device for security of a wireless communication between the communication device and a counterpart communication device, the apparatus comprising:

at least one processor; and at least one memory storing instructions that, when executed by the at least one processor, cause the apparatus at least to perform:

cipher a fixed part of a medium access control (MAC) protocol data unit (PDU) at MAC layer for the wireless communication, wherein a size of the fixed part of the MAC PDU is a size that matches a block size of a block cipher that is applied to encrypt the fixed part or a multiple of the block size of the block cipher, wherein parts of the MAC PDU other than the fixed part are not ciphered at the MAC layer, and wherein, the fixed part of the MAC PDU comprises the following fields:

at least one MAC control element, and at least one header of radio protocol.

2. A method performed at a communication device for security of a wireless communication between the communication device and a counterpart communication device, the method comprising:

ciphering, at the communication device, a fixed part of a medium access control (MAC) protocol data unit (PDU) at MAC layer for the wireless communication, wherein a size of the fixed part of the MAC PDU is a size that matches a block size of a block cipher that is applied to encrypt the fixed part or a multiple of the block size of the block cipher, wherein parts of the MAC PDU other than the fixed part are not ciphered at the MAC layer, and wherein, the fixed part of the MAC PDU comprises of the following fields:

at least one MAC control element, and at least one header of radio protocol in the MAC PDU.

3. The method according to claim 2, wherein the at least one header of radio protocol comprises at least one of:

one or more MAC subheaders of MAC service data units (SDUs) included in the MAC PDU;

one or more radio link control (RLC) headers; or one or more packet data convergence protocol (PDCP) headers.

4. The method according to claim 2, further comprising:

determining how to build the MAC PDU, based on the size of the fixed part of the MAC PDU, or based on a location of the fixed part within the MAC PDU, or based on the size of the fixed part of the MAC PDU and a location of the fixed part within the MAC PDU.

5. The method according to claim 4, wherein determining how to build the MAC PDU comprises determining how to build the MAC PDU according to at least one of the following principles:

in case that there are a plurality of MAC control elements to be included in the MAC PDU, one or more MAC control elements of the plurality of MAC control elements is placed outside the fixed part, or is postponed to a next MAC PDU;

in case that there are a plurality of MAC control elements to be included in the fixed part, an order in which the plurality of MAC control elements are included in the fixed part is randomized;

in case that there are a plurality of MAC SDUs to be included in the MAC PDU, subheaders of respective MAC SDUs are concatenated at the beginning or end of the MAC PDU;

in case that there are a plurality of MAC SDUs to be included in the MAC PDU, an order in which the plurality of MAC SDUs are included in the MAC PDU changes from one MAC PDU to another MAC PDU;

in case that there are padding bits to be included in the fixed part, the padding bits are randomized bits; or one or more MAC control elements of the MAC PDU to be ciphered are placed in the fixed part at the beginning or the end of the MAC PDU, while the other MAC control elements of the MAC PDU are placed at an opposite side of the MAC PDU.

6. The method according to claim 2, wherein the fixed part of the MAC PDU is started with a random nonce.

7. The method according to claim 2, wherein the fixed part of the MAC PDU comprises a MAC control element (MAC CE) with random content.

8. The method according to claim 2, further comprising:

obtaining an indication of the size of the fixed part of the MAC PDU; or obtaining an indication of one or more candidate sizes of the fixed part, and selecting one candidate size as the size of the fixed part of the MAC PDU.

9. The method according to claim 8, wherein, obtaining the indication of the size of the fixed part of the MAC PDU comprises receiving by the communication device, an indication of the size of the fixed part of the MAC PDU; or obtaining the indication of one or more candidate sizes of the fixed part of the MAC PDU comprises receiving by the communication device, an indication of one or more candidate sizes of the fixed part, and selecting one candidate size as the size of the fixed part of the MAC PDU.

10. The method according to claim 8, wherein the obtained indication comprises at least one of the following:

a capability parameter of the communication device, which indicates one or more candidate sizes of the fixed part of the MAC PDU supported by the communication device; or a capability parameter of the counterpart communication device, which indicates one or more candidate sizes of the fixed part of the MAC PDU supported by the counterpart communication device.

11. The method according to claim 2, further comprising:

sending to the counterpart communication device, an indication of the size of the fixed part of the MAC PDU; or sending to the counterpart communication device, an indication of one or more candidate sizes of the fixed part of the MAC PDU.

12. The method according to claim 11, wherein the sent indication comprises:

a capability parameter of the communication device, which indicates one or more candidate sizes of the fixed part of the MAC PDU supported by the communication device.

13. The method according to claim 2, further comprising:

delivering the ciphered MAC PDU to a physical layer for transmission to a counterpart communication device.

* * * * *